US012762137B2

(12) United States Patent
Ajzenman et al.

(10) Patent No.: US 12,762,137 B2
(45) Date of Patent: Oct. 13, 2026

(54) EXECUTING DIFFERENTIALLY PRIVATE QUERY USING STRUCTURED LANGUAGE PARSING

(71) Applicant: Snowflake Inc., Bozeman, MT (US)

(72) Inventors: Gustavo Ajzenman, Albany, CA (US); Khalid Zaman Bijon, Santa Cruz, CA (US); Yankai Liu, Menlo Park, CA (US); Oana Niculaescu, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 23 days.

(21) Appl. No.: 18/933,038

(22) Filed: Oct. 31, 2024

(65) Prior Publication Data

US 2026/0037530 A1 Feb. 5, 2026

Related U.S. Application Data

(60) Provisional application No. 63/677,057, filed on Jul. 30, 2024.

(51) Int. Cl.
*G06F 16/248* (2019.01)
*G06F 16/242* (2019.01)
*G06F 16/2455* (2019.01)

(52) U.S. Cl.
CPC .......... *G06F 16/248* (2019.01); *G06F 16/243* (2019.01); *G06F 16/24553* (2019.01)

(58) Field of Classification Search
None
See application file for complete search history.

(56) References Cited

U.S. PATENT DOCUMENTS

2015/0169302 A1* 6/2015 DeAnna .................... G06F 8/30 717/140
2017/0169253 A1* 6/2017 Curcio ................ G06F 21/6254
2018/0096166 A1* 4/2018 Rogers .................. G06F 16/951
2020/0301917 A1* 9/2020 Niu .......................... G06N 5/04
2020/0380159 A1* 12/2020 Lilly ................... G06F 21/6227
2023/0401331 A1* 12/2023 Xu ...................... G06F 21/6254

OTHER PUBLICATIONS

Campigotto ("Introduction to Differential Privacy," Nov. 26, 2020) (Year: 2020).*

* cited by examiner

*Primary Examiner* — Yu Zhao
(74) *Attorney, Agent, or Firm* — Schwegman Lundberg & Woessner, P.A.

(57) ABSTRACT

Various example embodiments described herein provide for systems, methods, devices, instructions, and the like for structured language parsing to execute a differentially private query on a database system. According to some example embodiments, a user (e.g., an analyst) submits to a data system (e.g., data platform) a differentially private query using a structured language interface (e.g., SQL interface), which causes the calling of one or more stored procedures on the data system, where the one or more stored procedures encapsulate or facilitate use of a differential privacy engine, which can execute the differentially private query and generate a differentially private query result.

20 Claims, 6 Drawing Sheets

EXECUTING DIFFERENTIALLY PRIVATE QUERY USING STRUCTURED LANGUAGE PARSING

CROSS-REFERENCE TO RELATED APPLICATIONS

This application claims priority to and the benefit of U.S. Provisional Patent Application No. 63/677,057, entitled "EXECUTING DIFFERENTIALLY PRIVATE QUERY USING STRUCTURED LANGUAGE PARSING," filed on Jun. 30, 2024, which is incorporated herein by reference in its entirety.

TECHNICAL FIELD

The present disclosure generally relates to data systems and, more specifically, to implementations of a database system that uses structured language parsing to execute a differentially private query on the database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented databases, and others.

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing the behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used and may react negatively if it is publicly disclosed. As a result, companies that collect and maintain personal data seek ways to extract value from it without running afoul of such rules and expectations.

BRIEF DESCRIPTION OF THE DRAWINGS

The present disclosure will be understood more fully from the detailed description given below and from the accompanying drawings of various example embodiments of the disclosure.

DETAILED DESCRIPTION

Figure 1:
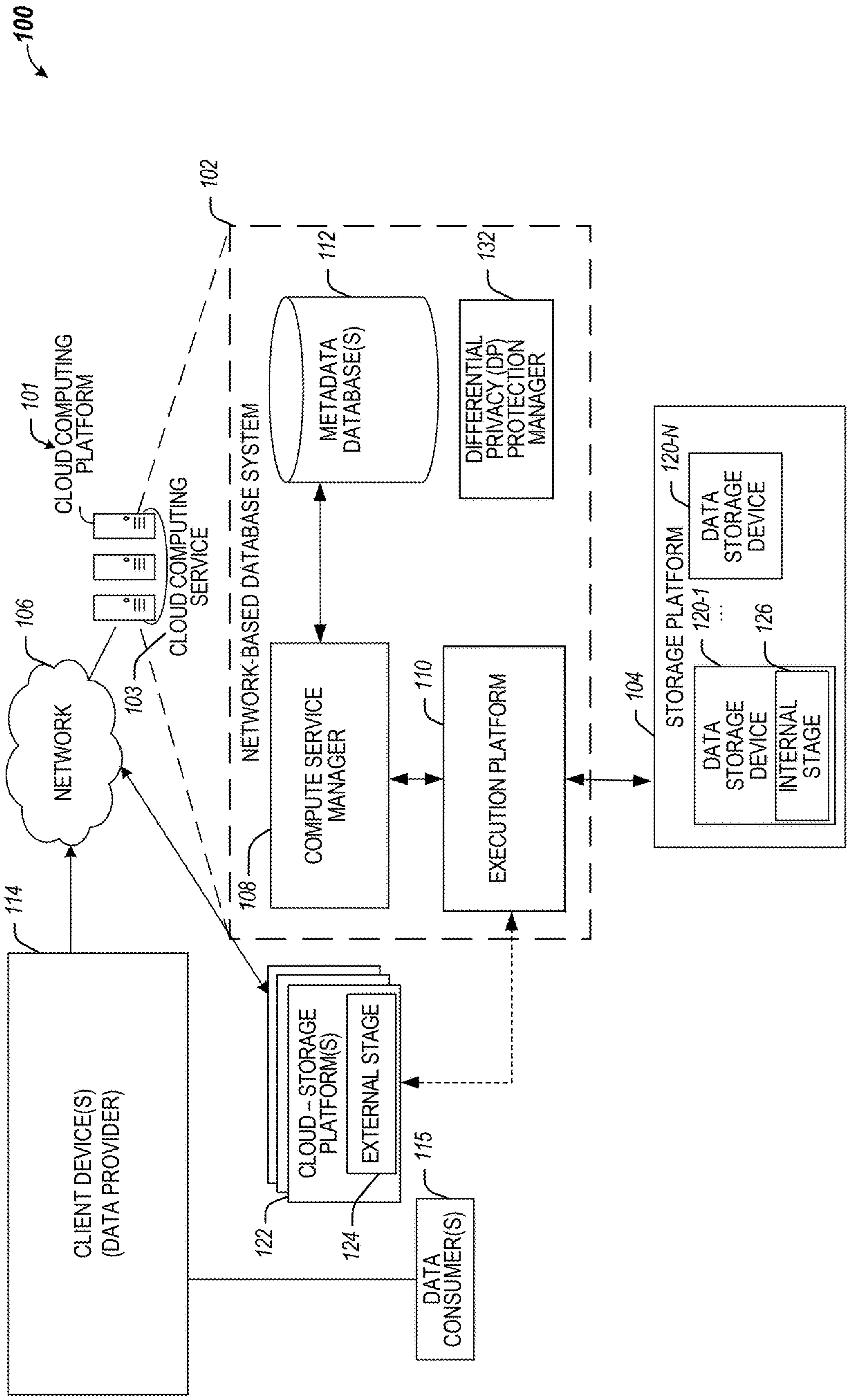
FIG. 1 illustrates an example computing environment that includes a network-based database system in communication with a cloud storage platform, according to some example embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

One set of techniques for using personal data involves removing personally identifiable information from the data through masking, hashing, anonymization, aggregation, and tokenization. These techniques tend to be resource-intensive and may compromise analytical utility. For example, data masking may remove or distort data, compromising the statistical properties of the data. These techniques also often fail to protect individual privacy.

An additional technique makes use of Differential Privacy (DP). Differential privacy is a technology that injects noise into results provided by statistical databases to protect private information. A differentially private system provides differentially private results in response to database queries. The amount of private information provided by the system may depend, in part, on a "privacy budget" that describes the amount of privacy that may be "spent" to retrieve information from the database. The differentially private system needs to calculate privacy spend correctly because it directly impacts the analytical utility of the information in the database. It is likewise essential for the system to minimize privacy spend to the extent possible to provide a privacy budget for additional queries for the same reason.

DP technology is based on a formal mathematical framework for quantifying and managing privacy risks. It can be used to protect data against a wide range of potential privacy attacks that seek to learn sensitive information or even reconstruct exact values in the sensitive data. Differential privacy technology emerged as a tool to protect sensitive data under the release of aggregate statistics. Overall, differential privacy provides a standard for accessing data, and it is not a property of data. A computation can meet the standard of differential privacy, in which case the data is protected. Specifically, a computation (e.g., a data query) is differentially private if you cannot ascertain from the outputs of the computation (e.g., the query result) whether a specific subject in the data was present. This is equivalent to saying that if a computation is differentially private, it will not unduly reveal information specific to any data subject. A data subject can be a transaction, an individual, or more generally an entity, e.g., a company.

Differential privacy technology can permit a user (e.g., data user) of a data system to share and collaborate on data sets containing sensitive information, including personally identifiable information (PII), with an analyst (e.g., analyst user), where the analyst can analyze the data without gaining direct access to the sensitive information. Generally, a data system using DP restricts direct access to an individual record of a dataset by only allowing aggregate queries to be performed on the dataset, where each aggregate query mathematically applies noise to the result so that the user cannot gain insight about sensitive information (stored by the individual records of the dataset) from the result. In particular, the overall flow comprises: an administrator applies a differential private policy to a table in which one or more rows can comprise sensitive information (e.g., about individuals, such as a name, address, gender, age, income, occupation); and an analyst can run one or more aggregate queries against the table, such as a query for average income grouped by occupation, but cannot run any queries that target any specific record (e.g., any specific individuals).

As noted, DP technology usually implements a privacy budget, which can gate the number of queries run by a given user (e.g., analyst user).

While other privacy technologies exist, differential privacy technology has the benefit of strong, mathematically-proven privacy guarantees. Additionally, differential privacy technology is well-suited for use cases where a data consumer (e.g., analyst user) is untrusted or adversarial to a data provider or where data is shared with an untrusted analyst (e.g., intra-organization or inter-organization analyst).

As used herein, noise can comprise randomly generated noise (e.g., noise data) that is added (e.g., injected) to a result (e.g., query result) of a computation (e.g., query) to cause the result to meet a standard of differential privacy (e.g., to render the result differentially private). Noise can be drawn from a distribution (e.g., Laplace or Gaussian distribution), which can be carefully tuned to balance privacy and utility.

As used herein, a differentially private query (or differentially private query) can refer to a query to a data system that uses differential privacy. As used herein, a differentially private query result (or differentially private query result) can refer to a query result, generated by a data system that uses differential privacy, in response to a differentially private query. As used herein, utility can refer to the accuracy of a differentially private query result. Generally, high utility results from injection of low noise. As used herein, a data system (or data platform) that uses or supports differential privacy can be referred to as differential privacy (DP) data system (or DP data platform) or a differentially private data system (or differentially private data platform).

As used herein, privacy loss (also referred to as privacy risk) can comprise a quantified metric that measures the risk of a successful privacy attack (e.g., that a specific subject's data has been compromised) or tracks (e.g., tracks) how much information has been compromised (e.g., amount of information leakage). Generally, as privacy loss goes up, privacy of sensitive information goes down. As more computations (e.g., queries) are run on data whose results are released, the total privacy loss and risk increase. A data owner (or data admin) can choose a threshold (e.g., a privacy budget) of privacy loss beyond which the risk of releasing more information is too high.

As used herein, a privacy budget can comprise a threshold that limits the amount of privacy a user (e.g., analyst user) can spend on data (e.g., the user can query). A privacy budget can be expressed as a positive real number. The magnitude of noise added to a computation result (e.g., query result) can be inversely proportional to the privacy loss incurred (e.g., privacy spent). This can be referred to as the privacy-utility tradeoff. A privacy budget can be enforced in different ways. For instance, under a fixed privacy budget (or a fixed privacy budget mode), a differential privacy data system looks across all of the queries that a user has run on the table or view to calculate privacy spent. In another example, under a rolling privacy budget (or a rolling privacy budget mode), a differential privacy data system looks at recent queries that a user has run based on a rolling time window to calculate privacy spent (e.g., consider the privacy spent in the last 7 days starting from when a new query is requested).

As used herein, a privacy profile can comprise a set of privacy settings, which can be configured by, or pre-configured for, an administrator (e.g., admin user).

As used herein, trust can refer to a data provider's expectation of a data consumer's behavior. As used herein, a trust level can refer to a degree to which a data consumer is trusted with knowing the content (e.g., sensitive information) of data from a dataset. In terms of trust levels, fully trusted can refer to a degree of trust where a data provider has no concerns about a data consumer of the data knowing the content of data from a dataset. Semi-trusted can refer to a degree of trust where there is certain information in data from a dataset that a data provider would like to hide from the consumer, and the data provider has confidence the consumer will respect this boundary. Untrusted can refer to a degree of trust where there is information in the data from a data set that a data provider does not want a data consumer to access, and the data provider does not have full confidence that the data consumer will respect the boundary. At the untrusted level, there is reason to believe that the data consumer will not actively reverse engineer the sensitive information. Adversarial can refer to a degree of trust where the incentives of a data provider and a data consumer are diametrically opposed—the data consumer (or some subset of data consumers) has incentives to discover exactly the information the data provider intends to protect.

As used herein, a privacy attack can refer to a set of queries (e.g., DP queries) used to attempt to discover information (e.g., sensitive information), in private data from a dataset, to a high degree of confidence. A privacy attack can range from very naive (e.g., SELECT *) to very sophisticated, which can require expertise in information theory. As noted herein, differential privacy (DP) was created to protect against any privacy attack known or unknown, concrete or theoretical. Relaxations in DP (e.g., on a differentially private data system as described herein) must consider whether specific types of attacks are prevented. When relaxing DP (e.g., on a differentially private data system as described herein) for use in real-world use cases, an administrator should consider how realistic a specific type of attack would be.

With respect to users of a data system (that uses or otherwise supports differential privacy) as described herein, an administrator (or admin user) can be a trusted user of the data system who has permission to manage a differential privacy configuration. An analyst (or an analyst user) can be a user who is writing a differentially private query against one or more tables protected by differential privacy. A data consumer can refer to a person who wants to see differentially private query results from a differentially private query performed against data. A data consumer is not necessarily an analyst, and a data consumer generally does not run any differentially private queries on one or more tables that are private to the data consumer.

Overall, DP allows a user to share and collaborate data sets containing sensitive information, including PII, with an analyst where the analyst can analyze the data without gaining direct access to the sensitive information. DP restricts direct access to the individual record of a dataset and by only allowing aggregate queries where it mathematically applies noise to the result so that the user cannot gain insight about an individual from the result. DP also implements a privacy budget to gate the number of queries run by a user. As an example, a data steward (e.g., administrator) can apply a DP policy to a table in which each row contains sensitive information about individuals (e.g., name, address, gender, age, income, occupation). Then an analyst can run aggregate queries against this table (e.g., average income grouped by occupation), but cannot run queries that target specific individuals.

Various example embodiments described herein relate to data systems that use differential privacy and, more specifically, using structured language parsing to execute a differentially private query on a data system (e.g., a data platform). According to some example embodiments, a user (e.g., an analyst) submits to a data system (e.g., data platform) a differentially private query using a structured language interface (e.g., SQL interface), which causes the calling of one or more stored procedures on the data system, where the one or more stored procedures encapsulate or facilitate use of a differential privacy engine (also referred to herein as a privacy engine or PE), which can execute the differentially private query and generate a differentially private query result. As used herein, a differential privacy engine can generate and submit a set (e.g., series) of non-DP queries to the data system, receive a set of non-differentially private query results from the data system, and generate (e.g., computes) one or more differentially private query results based on the set of non-DP queries (e.g., by generating noise, applying the noise to the set of non-differentially private query results based on one or more differential privacy policies, and charge a privacy budget). According to some example embodiments, a compiler (also referred to herein as a structure language compiler or query compiler) intercepts a data query (or query), detects whether the data query is a differentially private query, and, in response to detecting that the data query is a differentially private query, rewrites the parsing (e.g., a parse tree) of the data query to invoke a privacy engine with necessary payload data (e.g., based on the data query) in order to generate a differentially private result for the data query. The privacy engine can generate one or more queries (e.g., sub-queries) on a data platform based on the data query to compute one or more query results for the data query, can generate noise to be applied to the one or more query results, and can charge privacy budget.

Depending on the embodiment, an administrator can grant permission to a data user (e.g., data steward) to manage a differential privacy (DP) configuration. A customer can programmatically define their own logic regarding DP, thereby providing extensibility. A DP policy can leverage policy concepts and syntax similar to other policies. An administrator can prevent users from observing both logic of a DP policy and mapping tables that implement restrictions (e.g., DP restrictions, such as policy conditions) of the DP policy. A given DP policy can apply to multiple tables and views with scalability (e.g., 100k+ tables and views). To facilitate this, an embodiment can use one or more stored procedures to share logic of a DP policy across multiple tables or view using.

Depending on the embodiment, an administrator can configure entity-level or row-level differential privacy (DP), with the latter being facilitated by way of an entity identification function. DP data access can be configured using Role-Based Access Control (RBAC). Some example embodiments can provide DP-protected data to data shares, which facilitate DP data sharing. An administrator can grant a user full access to DP-protected data (e.g., as one role of the user), DP-access to DP-protected data (e.g., as another role of the user), or both (e.g., for certain use cases in which a data provider is creating a privacy-preserving data product for data consumers using DP).

For some example embodiments, an administrator can explicitly identify one or more entities to a differentially private data system that should be protected by differential privacy (DP).

For various example embodiments, an analyst can directly query differential privacy (DP)-protected data as an untrusted party (rather than interacting with results produced by a trusted analyst). An analyst can view their privacy budget consumption, while being prevented from managing the privacy budget. For some example embodiments, a differentially private data system permits an analyst to contextualize the amount of noise in a differentially private query result produced by a differentially private query. For instance, a differentially private query result can include noise, and a differentially private data system can provide a randomization interval, which comprises an estimate of magnitude of noise around differentially private query results. A differentially private data system can generate an error message to a query from an analyst for various reasons, such as running a non-differentially private query on DP-protected data, or the query exceeding the analyst's privacy budget.

Depending on the embodiment, a differentially private data system can support DP access to DP-protected data through structured query language (SQL).

For various example embodiments, an administrator can configure use cases with a mix of private and non-private data. Some real-world use cases for differential privacy (DP) can involve both private and non-private data. In some cases the private and non-private data can be in separate sources (e.g., separate tables that are joined), and in some cases the private and non-private data could be mixed in one table. For some example embodiments, an analyst can run a differentially private query on this combination while only being potentially gated by privacy budget on the private data.

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 illustrates an example computing environment 100 that includes a database system in the example form of a network-based database system 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some example embodiments, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access the data of the data provider (e.g., data obtained via the client device 114).

In the description below, actions are ascribed to users, particularly consumers and providers. Such actions shall be understood to be performed concerning client devices (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some example embodiments, metadata database 112 is configured to store account object metadata (e.g., account objects used in connection with a replication group object).

Figure 3:
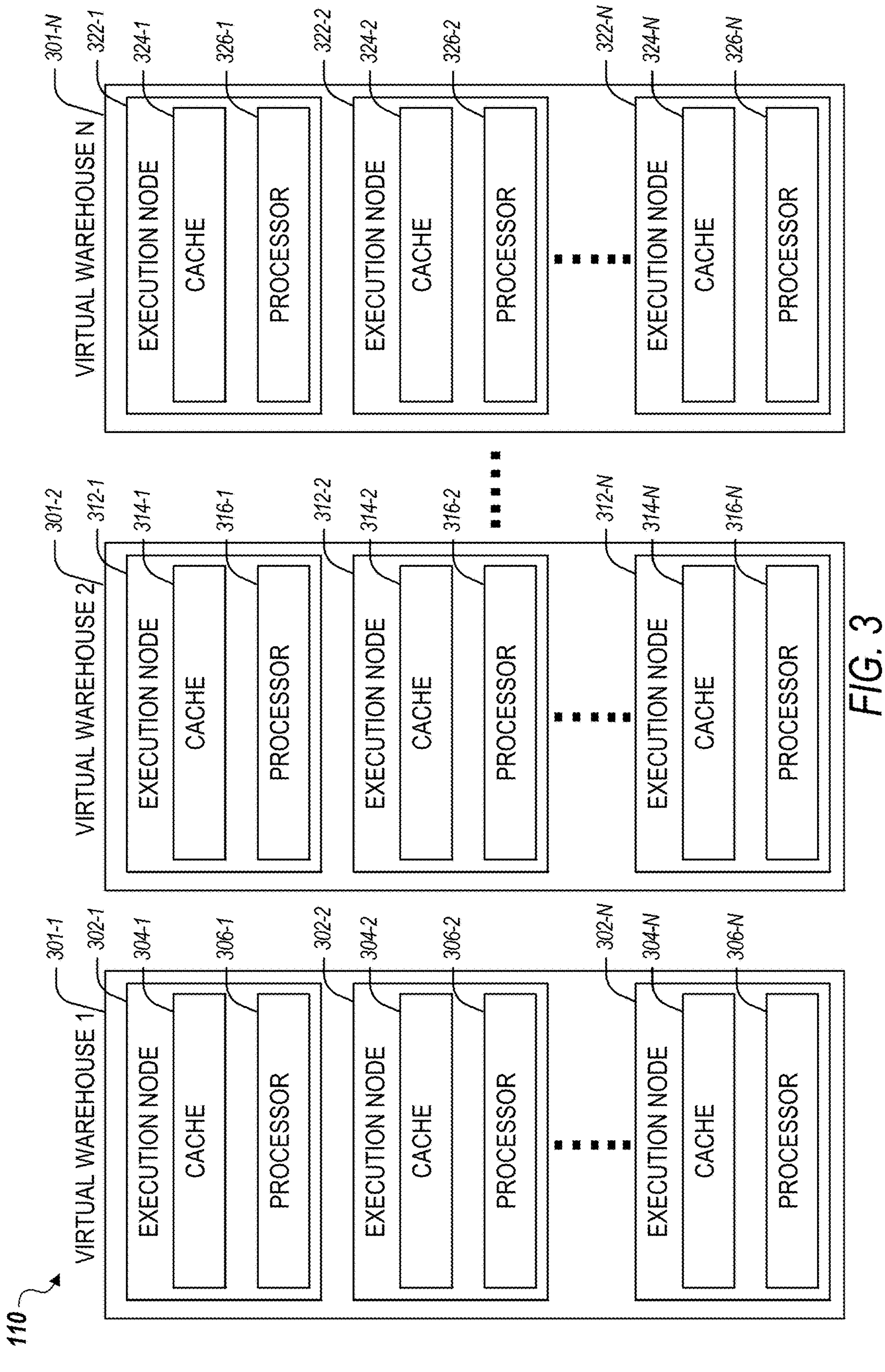
FIG. 3 is a diagram illustrating components of an execution platform, according to some example embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some example embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3® storage systems, or any other data-storage technology. Additionally, the cloud storage platform 104 may include distributed file systems (such as Hadoop Distributed File Systems (HDFS)), object storage systems, and the like. In some example embodiments, at least one internal stage 126 may reside on one or more of the data storage devices 120-1-120-N, and at least one external stage 124 may reside on one or more of the cloud storage platforms 122.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

In some example embodiments, the network-based database system 102 includes a differential privacy (DP) protection manager 132. The DP protection manager 132 comprises suitable circuitry, interfaces, logic, and/or code and is configured to facilitate differential privacy (DP) features with respect to one or more objects (e.g., tables or views of the network-based database system 102) according to various example embodiments. For instance, the DP protection manager 132 can facilitate use of structured language parsing to execute a differentially private query on the network-based database system 102 system as described herein. The following describes one or more features of DP implemented by the differential privacy (DP) protection manager 132 on the network-based database system 102, or some other data system.

A differentially private data system can support one or more of methods to support implementation of a differential privacy (DP) policy (also referred to herein as a privacy policy). A DP policy can be applied to any object that store data in tabular format, including both tables and views (e.g., materialized views, external tables), and protect the rows of the data in the object. Protection can be defined over a window of time defined by an administrator. A DP policy can be created (e.g., by an administrator) using: CREATE PRIVACY POLICY <name> AS ( ) RETURNS privacy_budget-><expression> [COMMENT=‘<string_literal>’]. The expression can be any privacy_budget-valued SQL expression. This can provide two ways to specify the privacy budget: (a) privacy_budget (budget_name: str) where budget_name is a unique identifier for budget name; and (b) no_privacy_policy( ) indicates that the policy allows for full access (SELECT) to the data. DP policy can enable a privacy engine of a differentially private data system to read sensitive data on behalf of users when a policy expression is evaluated. If the return value of the expression is NULL, this can highlight an error in how the privacy body was compiled and the differentially private data system can fail with a compilation error (in which case, no DP queries can be run on the entity to which the DP Policy is associated).

When the privacy engine wants to execute a differential privacy (DP) query on behalf of a role, a DP policy can be consulted to determine which budget to use.

For some example embodiments, enforcement of a differential privacy (DP) policy is performed on a differential privacy (DP) query comprising SELECT < >FROM < >. The DP policy may not be enforced if the DP policy was assigned to an underlying table/view as opposed to the view/table over which the user runs the differentially private query. The following shows how a DP policy would be evaluated and enforced in the scenario where we have a base Table T and a View V defined on Table T.

Set-up:

Table T
View V defined on Table T
INVOKER_ROLE ( )=V->the invoker role for View V
P1=privacy policy attached to Table T
P2=privacy policy attached to View V.
P1 could be the same as P2, or not
B1=privacy budget returned by P1
B2=privacy budget returned by P2

Query run:

SELECT <something>FROM V . . .

For the above, if a role A queries a table, the invoker_role would indicate A if the INVOKER_ROLE ( ) context function is used in the policy. However, assume a view V on table T, and view owner is R2 and the policy is attached to table. Now, if role R1 queries on the view V, the INVOKER_ROLE ( ) context function would return R2 (view owner's role). If there is a simple Table T on top of which a user wants to run a query, then the Table T can have a DP policy attached to it that evaluates to an actual PrivacyBudget. If the DP policy evaluates to a no_privacy_policy( ) then the query cannot be run through the privacy engine. If there is a View V on top of a table, then the table either needs to have no DP policy attached to it or return a no_privacy_policy( ) for the invoker of View V. Additionally, in order to run a query on View V through the privacy engine, View V needs to have a DP policy attached to it that evaluates to an actual budget. In any chain of data derivation, there may only be one valid PrivacyBudget active at a time and that budget would be attached to the entity on which the query is run.

Figure 2:
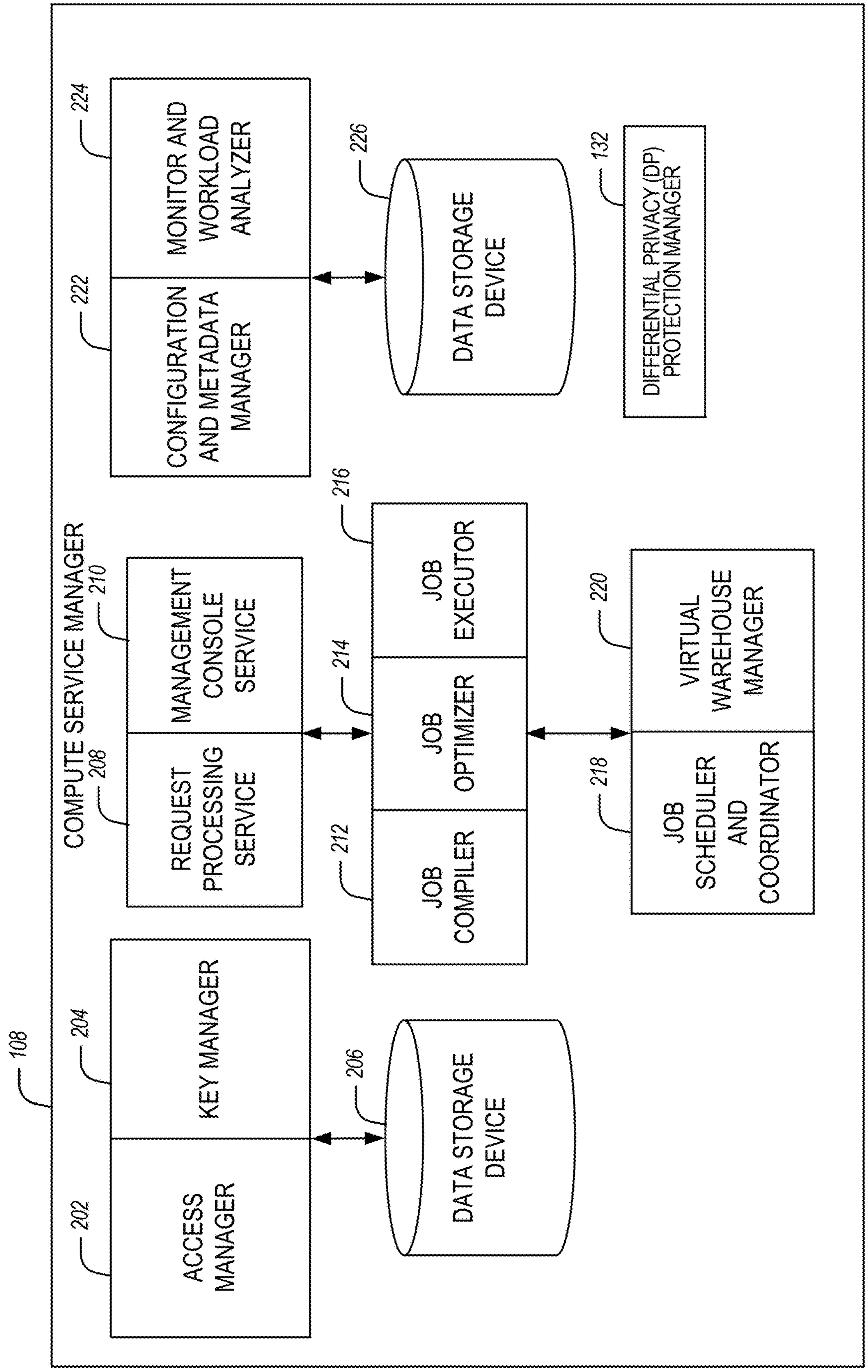
FIG. 2 is a diagram illustrating the components of a compute service manager, according to some example embodiments of the present disclosure.

FIG. 2 is a block diagram illustrating components of the compute service manager 108, according to some example embodiments. As shown in FIG. 2, the compute service manager 108 includes an access manager 202 and a key manager 204 coupled to an access metadata database 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some example embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the DP protection manager 132 configured to facilitate differential privacy (DP) features with respect to one or more objects (e.g., tables or views of the network-based database system 102) according to various example embodiments. For instance, the DP protection manager 132 can facilitate use of structured language parsing to execute a differentially private query (e.g., on the network-based database system 102) as described herein.

FIG. 3 is a block diagram illustrating components of the execution platform 110, according to some example embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some example embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues and network overhead). In some example embodiments, the imbalances are addressed at the scan level using a file-stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud storage platform 104 (e.g., from data storage device 120-1), and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some example embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some example embodiments, table data can be divided into one or more micro-partitions, which are contiguous units of storage. As used herein, the terms "partition files" (or "partition data files") and micro-partitions are interchangeable. In this regard, source table data can be stored as multiple partition files associated with the source table.

Figure 4:
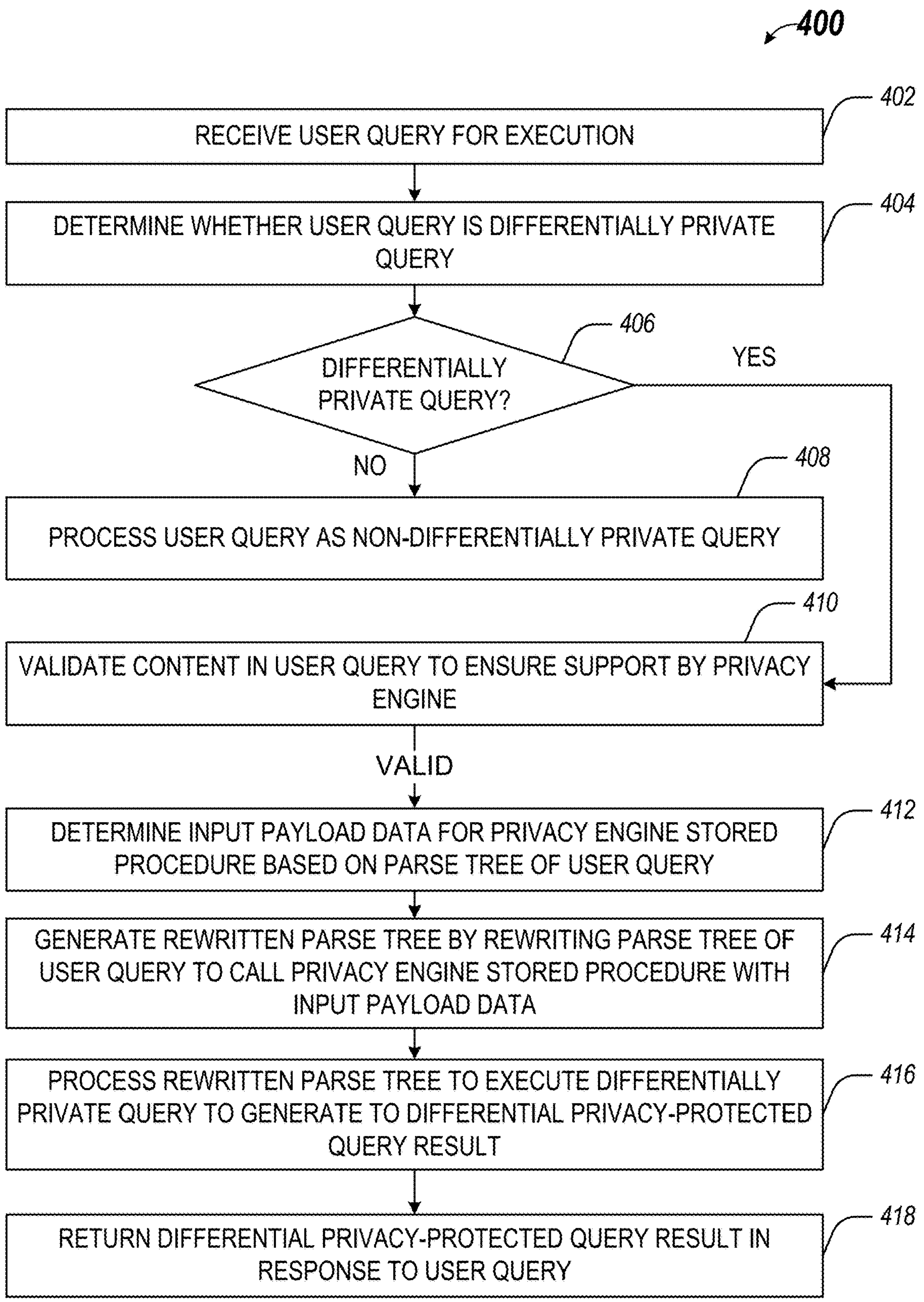
FIGS. 4 and 5 are flow diagrams illustrating example methods for using structured language parsing to execute a differentially private query on the database system, according to some example embodiments of the present disclosure.
Figure 5:
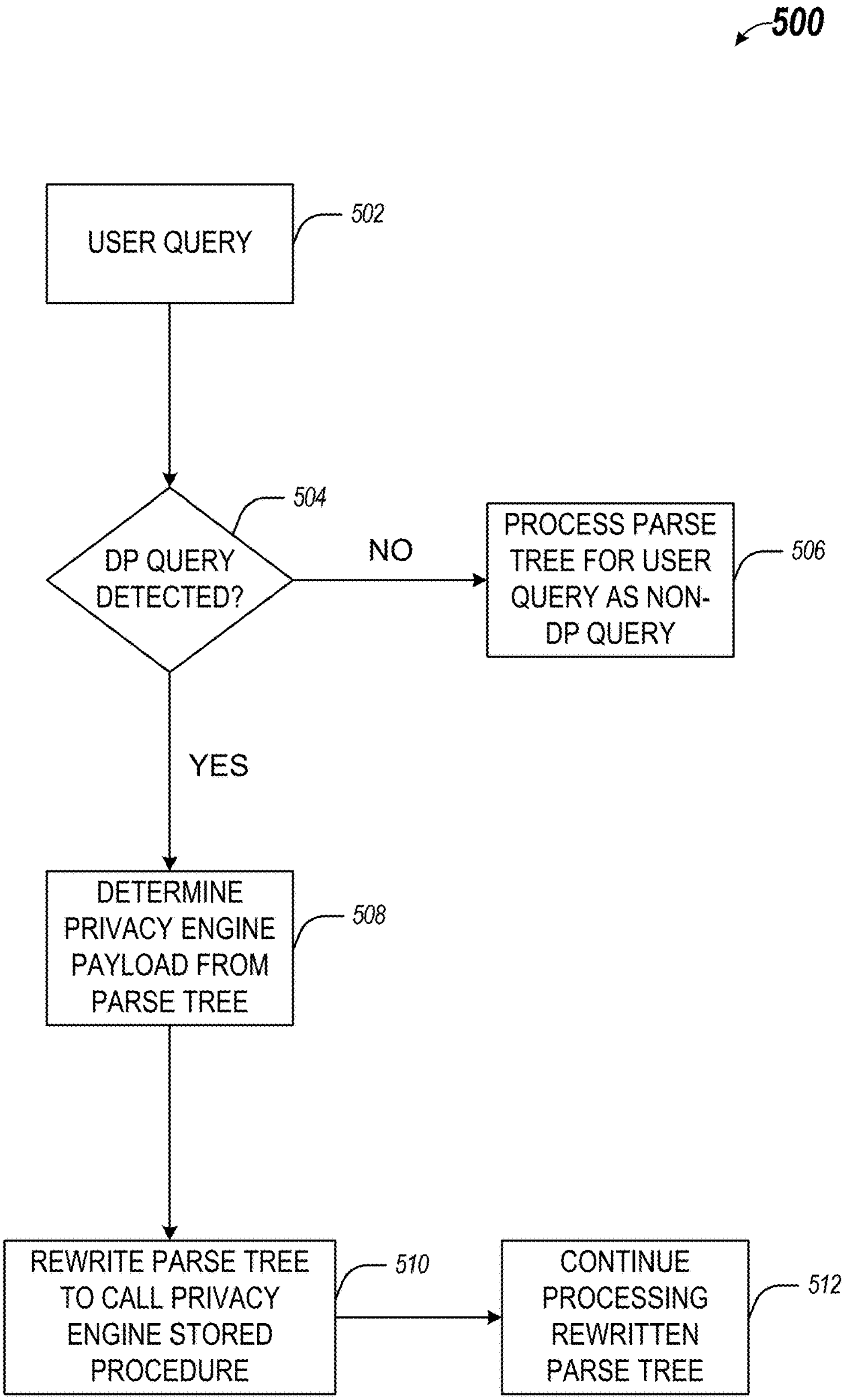

FIGS. 4 and 5 are flow diagrams illustrating example methods 400, 500 for using structured language parsing to execute a differentially private query on the database system, in accordance with some example embodiments of the present disclosure. Any of methods described herein (e.g., 400 or 500) may be embodied in computer-readable instructions for execution by one or more hardware components (e.g., one or more processors) such that the operations of the may be performed by components of the network-based database system 102, such as a differential privacy (DP) protection manager 132 or computing device which may be implemented as machine 600 of FIG. 6 and may be configured with an application connector performing the disclosed functions. Accordingly, methods 400, 500 are described below, by way of example with reference thereto. However, it shall be appreciated that any of methods 400 or 500 may be deployed on various other hardware configurations and is not intended to be limited to deployment within the network-based database system 102.

Referring now to FIG. 4, at operation 402, at least one processor (e.g., of the execution platform 110) receives a user query for execution. Operation 402 can initiate a process for handling a query within a data system, such as a database system (e.g., 102). At operation 404, the at least one processor determines (e.g., detects) whether the user query is a differentially private (DP) query. Depending on the example embodiment, operation 404 comprises traversing a named resolved parse tree to determine (e.g., identify or detect) whether the user query references a table, view, or other entity that is protected by a privacy policy.

At decision point 406, in response to determining that the user query is not a DP query, method 400 proceeds to operation 408, where the at least one processor processes the user query as a non-differentially private (non-DP) query. In doing so, differential privacy mechanisms can be bypassed for the user query. However, at decision point 406, in response to determining that the user query is a DP query, method 400 proceeds to operation 410.

During operation 410, the at least one processor validates content of the user query to ensure support by the privacy engine. Depending on the example embodiment, operation 410 can be performed as part of operation 412, or prior to operation 412 as shown in FIG. 4. For some example embodiments, operation 410 comprises validating one or more query patterns in the user query to ensure that the one or more query patterns are supported by the privacy engine (e.g., whether the one or more query patterns are compatible with the privacy engine's capabilities). For example, the at least one processor can validate one or more SQL constructs used in the user query to ensure they are supported by the privacy engine, and can do so by traversing a SQL abstract syntax tree and checking that nodes encountered in the SQL abstract syntax tree have valid corresponding nodes in a privacy engine abstract syntax tree. Additionally, the at least one processor can validate content of the user query by checking one or more functions called (in the user query) on one or more columns that represent an output of a private computation. In response to the content of the user query being validating, method 400 proceeds to operation 412.

At operation 412, the at least one processor determines (e.g., generates or prepares) input payload data for a privacy engine stored procedure based on a parse tree of the user query. For various example embodiments, the privacy engine stored procedure encapsulates or facilitates use of a privacy engine, which can execute a differentially private query and generate a differentially private query result in response to the differentially private query. According to various example embodiments, operation 412 comprises mapping one or more nodes in the parse tree (of the user query) to one or more fields of the input payload data.

For operation 414, the at least one processor generates rewritten parse tree by rewriting the parse tree of the user query to call the privacy engine stored procedure with the input payload data (determined during operation 412). For various example embodiments, rewriting of the parse tree comprises serializing the input payload data to generate serialized input payload data (e.g., to create a format suitable for user by the privacy engine), and then rewriting the parse tree to call the privacy engine stored procedure with the serialized input payload data. Where the user query comprises multiple nested aggregate functions (e.g., COUNT ([DISTINCT]), AVG, MEAN, and SUM), the processing of the rewritten parse tree can comprise processing an outermost aggregate function of the multiple nested aggregate functions (e.g., an aggregate function on an outermost query-block) as a private-aggregate function and all other aggregate functions of the multiple nested aggregate as non-private-aggregates, where the processing of the outermost aggregate function comprises injecting noise into a result generated by the aggregate function.

At operation 416, the at least one processor processes the rewritten parse tree to execute the user query to generate a differential privacy-protected query result. For various example embodiments, operation 416 comprises executing the privacy engine stored procedure with the input payload data. In doing so, the privacy engine can execute at least a portion of the user query based on input payload data. Where the user query comprises a join function, the processing of the rewritten parse tree can comprise processing the join function such that a column of a privacy protected table is prevented from being joined with a column that has duplicate values. Additionally, where the user query comprises a randomization interval function, the differential privacy-protected query result can comprise randomization interval information that contextualizes an estimated magnitude of noise in the differential privacy-protected query result. For example, the randomization interval information can comprise at least one of a lower bound of a randomization interval for the differentially private aggregate function, or an upper bound of the randomization interval for the differentially private aggregate.

During operation 418, the at least one processor returns the differential privacy-protected query result in response to the user query. As a result, a user can be provided with requested data (requested via the user query) while maintaining the privacy of sensitive information within the data system (e.g., database system).

Referring now to FIG. 5, initially, a user query 502 is received (e.g., from a user, such as an analyst) and starts being parsed (e.g., processed by a processing device (e.g., comprising a hardware processor)), which can implement a compiler (e.g., a structured language compiler, such as a SQL compiler). The parsing of the user query (502) results in a determination (e.g., generation) of a parse tree for the user query (502), which can facilitate execution of the user query by a database system.

At operation 504, the processing device detects whether the user query (502) is a differentially private query. For some example embodiments, the compiler detects the differentially private query during operation 504. The compiler can be implemented by the processing device. Operation 504 can represent the start of parsing of the user query (502).

If at operation 504 the processing device determines that the user query is not a differentially private query, method 500 proceeds to operation 506, where the processing device processes the parse tree for the user query (502) as a non-differentially private (non-DP) query. Alternatively, if at operation 504 the processing device determines that the user query is a differentially private (DP) query, method 500 proceeds to operation 508.

At operation 508, the processing device (e.g., the compiler implemented by the processing device) determines (e.g., prepared or generates) input payload data (also referred herein as a privacy engine payload), for a privacy engine stored procedure (e.g., that facilitates execution of the differentially private query), where the input payload data is determined based on (e.g., from) the parse tree of the user query (502).

Thereafter, at operation 510, the processing device (e.g., the compiler implemented by the processing device) rewrites the parse tree of the user query (502) to call the privacy engine stored procedure based on (e.g., using) the input payload data determined during operation 508. At operation 512, the processing device continues processing the rewritten parse tree for the user query (the parse tree as rewritten at operation 510), which results in the privacy engine stored procedure being called with the determined input payload data (e.g., generated input payload data). In doing so, execution of the user query can continue as a differentially private (DP) query. Eventually, the stored procedure can return a differential privacy-protected (DP-protected) query result, which can be returned to a user (e.g., the user that submitted the user query 502).

Where the user query (502) is a differentially private query, the user query (502) can involve a table or a view for which a privacy policy is applied to a user (e.g., executing user) that submitted the user query (502). A privacy policy can be applied to a table (or a view) when a body of a policy returns a PRIVACY_BUDGET for a given query (e.g., user query 502). For instance, the following policy p can return a PRIVACY_BUDGET ‘budget1’ if associated to a table that was used in the user query (502) and the user query is considered a differentially private query:

```
CREATE PRIVACY POLICY p AS ( ) RETURNS
PRIVACY_BUDGET ->
PRIVACY_BUDGET(BUDGET_NAME=>‘budget1’).
```

To implement detection of differentially private queries at operation 504, at a semantic analysis stage, the processing device can traverse a named resolved parse tree to detect if a table (or view) is protected by a privacy policy and, if so, mark the query as a differentially private query (e.g., dp_query).

Once the processing devices detects the user query (502) as a differentially private query (at operation 504), the processing device can generate the input payload data (e.g., PrivacyEnginePayloadDTO) for the privacy-engine stored procedure (at operation 508) by traversing the parse tree for the user query. Specifically, the processing device can map nodes in the parse tree to a specific field of the input payload data. While generating the input payload data, the processing device can validate any query pattern that is not supported by the privacy engine. Support query patterns can include, without limitation, scalar function (e.g., ABS, CEIL, COALESCE, DATE_FORMAT, DATE_FROM_PARTS, DATE_PART, DATE_TRUNC, DAYOFMONTH, etc.), set operators (e.g., UNION, UNION ALL), and other query patterns (e.g., LIMIT, ORDER BY, HAVING).

The following Table 1 represents an example user query that is detected as a differentially private query, and Table 2 presents an example input payload data generated for the example user query, which is defined in a JSON format.

TABLE 1

```
SELECT AVG(num_pets) FROM input GROUP BY age;
// 2, {u=1, 1=0, c=0.95}
// 3, u, 1, c
// 4
```

TABLE 2

```
{
“method”: “RUN_GROUP_BY”, “analysis”: [
“ANALYSIS”, [
“GroupbyAggregation”, 0,
[
[
“MeanAgg”,
[
“ATTRIBUTE”, “\“NUM_PETS\””
]
]
], [
[
“ATTRIBUTE”, “AGE”
]
]
], [
“TABLE”, “INPUT”
],
{
“computationPrivacy”: [ “Private”,
null, null
],
“allowSmallDataset”: true, “userSpecifiedSizeThreshold”: null
}
],
“outputs”: [
{
“type”: “key”, “index”: 0, “attr”: “key”,
“alias”: “\“AGE\””
},
{
```

TABLE 2-continued

"type": "result", "index": 0, "attr": "result",
"alias": "AVG(NUM_PETS)"
}
]
}

For operation 510, the processing device can serialize the generated input payload data and can rewrite the parse tree to CALL the privacy engine stored procedure with the serialized input payload data. To rewrite the parse tree, the processing device can use 'EXECUTE <query-id>' operation, which can rewrite the parse tree with the given query text of the given <query-id>. This operation can be performed in the semantic analysis layer of the compiler. Thereafter, at operation 512, the processing device can continue the remainder of the compilation (of the user query) and eventually execute on the rewritten CALL statement when encountered in the rewritten parse tree (e.g., after name resolution).

Various example embodiments implement implicit disambiguation between private and non-private aggregation. A query can have multiple nested aggregates. For instance, the following query outputs the maximum number of average num_pets owned by an age group: SELECT MAX(n_p) FROM (SELECT AVG(num_pets) n_p FROM input GROUP BY age). In order to protect privacy, some example embodiments inject noise in only one aggregate, which can be referred to as the privacy-aggregate (as opposed to a non-private-aggregate, which does not receive injected noise). For instance, the query can have one aggregate computation on top of the privacy protected table. When more than one aggregate is called, the processing device can treat the aggregate on the outer most query-block as the private-aggregate and all other aggregates down below can be treated as non-private-aggregate. Examples of private-aggregates with group by can include, without limitation, COUNT([DISTINCT]), AVG, MEAN, and SUM. Examples of private-aggregates without group by can include, COUNT([DISTINCT]), AVG, MEAN, SUM, MEDIAN, and VARIANCE. Examples of non-private-aggregates with group by can include, COUNT([DISTINCT]), AVG, MAX, MIN, MEAN, and SUM.

With respect to support for join behavior, various example embodiments can support one or more (e.g., all) join types. To protect against amplification attack by duplicates, some example embodiments prevent a column of privacy protected table to be joined with a column that has duplicate values. In order to allow the join, a user can de-duplicate the values in the query syntax before using such a join key). For example, the user can use a SQL command of DROP_DUPLICATE to get rid of duplicate values (e.g., using GROUP-BY with ANY_VALUE/MAX/MIN etc.).

For some example embodiments, a differentially private data system permits a user (e.g., analyst) to contextualize the amount of noise in a differentially private query result produced by a differentially private query. For instance, a differentially private query result can include noise, and a differentially private data system can provide a randomization interval, which comprises an estimate of magnitude of noise around differentially private query results. To support randomization intervals, various example embodiments implement one or more functions, such as those listed in Table 3 below.

TABLE 3

| Function | User Behavior |
|---|---|
| LOWER_BOUND (<AGGREGATE_OUTPUT_COL_ALIAS>) | Returns the lower bound of the randomization intervals for DP aggregates. The column name can be alias of the aggregate output column of a private query. |
| UPPER_BOUND (<AGGREGATE_OUTPUT_COL_ALIAS>) | Returns the upper bound of the randomization intervals for DP aggregates. The column name can be alias of the aggregate output column. |
| CONFIDENCE_INTERVAL(<AGGREGATE_OUTPUT_COL_A LIAS>) | Returns the upper bound of the randomization intervals for DP aggregates. The column name can be alias of the aggregate output column. |

As an example, if a user wants to know the confidence interval of the above query, they can call the functions as follows:

```
SELECT age, AVG(num_pets) avg, LOWER_BOUND(avg),
UPPER_BOUND(avg), CONFIDENCE_INTERVAL(avg) FROM input
GROUP BY 1.
```

The above query can cause the return DP-protected results by injecting noise and charging an appropriate privacy budget. The result could be something like the following Table 4.

TABLE 4

| AGE | AVG | LOWER_BOUND (AVG) | UPPER_BOUND (AVG) | CONFIDENCE_INTERVAL(AVG) |
|---|---|---|---|---|
| 40 | 4.5 | 3 | 5 | 0.95 |
| 41 | 3.2 | 2 | 6 | 0.95 |
| 42 | 2.2 | 1 | 2 | 0.95 |
| 43 | 5.5 | 4 | 6 | 0.95 |
| 50 | 3.0 | 2 | 4 | 0.95 |
| 51 | 2.9 | 2 | 4 | 0.95 |
| 52 | 1.2 | 0 | 2 | 0.95 |
| 57 | 5.5 | 3 | 7 | 0.95 |

With respect to supporting query rewriting, the processing device can implement a query rewriter (e.g., query rewriter process) configured to rewrite a parse tree of a differentially private query such that the parse tree causes a privacy engine stored procedure to be invoked with input payload data determined (e.g., generated) based on the differentially private query. The query received by the privacy engine query can be composed of an analysis (or analyses), a relation on which the analysis (or analyses) will be performed, and a list of results (e.g., differentially private results) to return. An analysis can comprise a) an aggregation that can be performed over the relation, or b) the relation and a group by clause.

The distinction in analyses can be identified in a first node (e.g., query request) of the privacy engine's tree (e.g., abstract syntax tree (AST)), which represents a query request. The query request can be a RUN_SELECT_SCALARS or a RUN_GROUP_BY. The RUN_SELECT_SCALARS can comprise a list of aggregations, each one paired with a relation. The RUN_GROUP_BY, on the other hand, can comprise a list of aggregations, a list of group by keys, and a single relation.

Take for example the following query: SELECT count (*), avg (age) from customer. This can be represented by the example tree for the privacy engine (e.g., PE AST) shown in Table 5 below.

TABLE 5

```
RUN_SELECT_SCALARS
[ Analysis
{ analysis = COUNT
, relation = ..customer relation..
}
, Analysis
{ analysis = AVG (age_expression)
, relation = ..customer relation..
}
]
[ OutputCol {
outputSrc = ScalarResult 0 RESULT, outputAlias = "count(*)"
}
, OutputCol {
outputSrc = ScalarResult 0 RESULT, outputAlias = "avg(age)"
}
]
```

Compare this with the following query: SELECT city, count (*), avg (age) from customer GROUP BY city, which results in the example tree of the privacy engine (e.g., PE AST) shown in Table 6 below.

TABLE 6

```
RUN_GROUP_BY
Analysis
{ analysis =
GroupByAnalysis
[ATTRIBUTE "city"]
[COUNT, AVG (ATTRIBUTE "age")]
, relation = ..customer relation..
}
[
OutputCol {
outputSrc = GroupByKey 0, outputAlias = "city"
}
, OutputCol {
outputSrc = GroupByResult 0 RESULT, outputAlias = "count(*)"
}
, OutputCol {
outputSrc = GroupByResult 0 RESULT, outputAlias = "avg(age)"
}
]
```

Each aggregation can produce an output node in the tree (e.g., PE AST).

For some example embodiments, relations in the privacy engine are part of the privacy engine's tree (e.g., PE AST), where a WHERE relation can have a FROM relation as a child. For instance, the example query of SELECT avg (net) FROM (SELECT floor(expenses−income) as net FROM items); can have a relation of SELECT (expenses−income) as net FROM items. This relation can be represented by the example tree of the privacy engine (e.g., PE AST) shown in Table 7 below.

TABLE 7

```
FROM
[
(
SUB (ATTR "expenses") (ATTR "income"), "net"
)
]
(TABLE "items")
```

For some example embodiments, input payload data for a privacy engine stored procedure is determined (e.g., generated) by a payload rewriter (e.g., payload rewriter process) implemented by a processing device. The payload rewriter can convert or transform a tree (e.g., parse tree) for a structured language (e.g., SQL AST) into a tree for the privacy engine (e.g., PE AST), serialize the resulting tree for the privacy engine (e.g., into JSON format data), and send the serialized data as an argument of the privacy engine stored procedure. The structured language parser (e.g., SQL parser) that generates the structured language tree can use a visitor pattern to avoid if statements, and leverage double dispatch instead. The types of nodes of the structured language tree that can be visited include, without limitation: SqlParseTree; SqlQueryBlock; SqlFrom; SqlObjectRef; SqlSelect; SqlNamedExpression; SqlColumnRef; SqlFunction; SqlWhere; SqlPredicate; SqlConstant; SqlGroupBy; SqlKey; and SqlIdentifier.

To perform the serialization of the tree for the privacy engine, the root of the tree (e.g., PE AST) can be serialized as a method that can be RUN_GROUP_BY or RUN_SELECT_SCALARS. Analyses objects can be serialized as arrays, where the first element is the name of the type of node, and the following elements are the arguments. The outputs section can be serialized as typical JSON objects. The following Table 8 illustrates an example of a serialized tree for the privacy engine.

TABLE 8

```
{
"method": "RUN_GROUP_BY", "analysis": [
"ANALYSIS", [
"GroupbyAggregation", 0,
[
[
"CountAgg"
]
], [
[
"ATTRIBUTE", "\"ZIP_CODE\""
]
]
],
[
"WHERE",
[
],
[
"NOT", [
"TABLE", "PRIVACY_ENGINE.PUBLIC.PATIENTS"
"IS_NULL", [
"ATTRIBUTE", "\"AGE\""
]
]
]
],
{
"computationPrivacy": [
"Private", null,
null
],
"allowSmallDataset": true, "userSpecifiedSizeThreshold": null
}
],
"outputs": [
{
"type": "key", "index": 0, "attr": "key",
"alias": "\"ZIP_CODE\""
},
{
```

TABLE 8-continued

```
"type": "result", "index": 0, "attr": "result",
"alias": "COUNT(MULTIPLY(AGE, LITERAL( )))"
}
]
}
```

Various example embodiments include a query validator (e.g., query validator process) implemented by a processing device. The query validator can validate (e.g., confirm or ensure) that structured language (e.g., SQL) constructs used in a query are supported by the privacy engine (e.g., PE can support a limited number of aggregations that can be run as analysis-running them returns to the user a private result, a limited number of aggregations that can be run under a GROUPBY analysis vs a GROUPBY relation etc.). Specifically, the query validator can traverse a structured language tree (e.g., SQL AST) and check that any encountered nodes (e.g., SqlNode) has a valid correspondent node in the tree for the privacy engine (e.g., PE AST). Where a structured language (e.g., SQL) construct is valid or not can depend on from where the construct is being called from—the same type of node can be interpreted differently according to the position in the tree. For some example embodiments, the query validator is combined with a query rewriter described herein.

For some example embodiments, the query validator comprises at least two stages. In a first stage, a visitor of the query validator could run on top of the structured language tree (e.g., parseTree) before starting to generate payload data for the privacy engine.

The query validator can filter the structured language (e.g., SQL) statements in into different types: structured language (e.g., SQL) Statements that need to be blocked (e.g., cannot be rewritten for the privacy engine); structured language (e.g., SQL) statements that can be rewritten for the privacy engine and can run the private queries corresponding to them; and structured language (e.g., SQL) Statements that need to be skipped from being rewritten or from being blocked. The query validator can parse only those queries that have a privacy policy attached to a table or view used in a SELECT query. In a second stage, the query validator can deal with any invalid combinations of private and non-private aggregates, requests for randomization intervals for invalid columns, and invalid structured language constructs (e.g., JOIN constructs).

To support randomization intervals (which can contextualize the differentially private query results), some example embodiments can validate structured language (e.g., SQL) function relating to randomization intervals (e.g., DP_INTERVAL_LOW(<AGGREGATE_OUTPUT_COL_ALIAS>), DP_INTERVAL_HIGH(<AGGREGATE_OUTPUT_COL_ALIAS>), or both), and then the payload rewriter can generate payload data for the randomization intervals. The validation of the structured language functions can be performed: in the payload rewrite right before payload data is generated for the privacy engine (e.g., validate by checking that the functions are called on columns that represent an output of a private computation); or before the payload rewriter. Randomization intervals can be supported for both scalar private aggregations (e.g., private sum, avg, count, etc.) as GroupBy private analyses. This means that SELECT COUNT(age), DP_INTERVAL_LOW (COUNT(age)), DP_INTERVAL_HIGH(COUNT(age)) from T GROUP BY zipcode; SELECT COUNT(age), DP_INTERVAL_LOW(COUNT(age)), DP_INTERVAL_HIGH(COUNT(age)) from T; and SELECT COUNT(age), AVG (AGE), DP_INTERVAL_LOW(COUNT(age)), DP_INTERVAL_HIGH(COUNT(age)), DP_INTERVAL_LOW(AVG (age)), DP_INTERVAL_HIGH (AVG (age)) from T; can be valid queries.

During input payload data generation, various example embodiments use aliasing to solve ambiguous join columns, which can enable the privacy engine to uniquely identify a column when multiple columns with the same name are being used in the query. Take for example the following query: SELECT COUNT(INPUT.C1) FROM (SELECT C1 FROM T1 group by C1) AS INPUT1 JOIN (SELECT C1 FROM T2 group by C1) AS INPUT2 ON INPUT1.C1=INPUT2.C1. With aliasing implemented, column c1 in subquery INPUT1 can be projected into INPUT1.C1, while column c1 in subquery INPUT2 can be projected into INPUT1.C2. In other words, any column in the SELECT block can be projected by the alias of the whole query block. As another example, consider the following query: SELECT C1 FROM (SELECT C1 FROM (SELECT C1 FROM T1) AS INPUT1) AS INPUT2. During input payload data generation, an embodiment can use the following projections: c1->input1.c1; c1(input1.c1)->input2.c1; and c1(input2.c1)->Directly used by privacy engine. The input payload data generation can be implemented in a recursive way, and aliasing can happen each time the FROM block of a SQL query is processed. If the FROM block only contains a table (no subquery), then aliasing will not happen. Additional examples of handling aliasing is shown in the following Table 9.

TABLE 9

| | |
|---|---|
| SELECT COUNT(C1) FROM TABLE | No aliasing, as FROM block only contains a table |
| SELECT COUNT(C1) FROM (SELECT C1 FROM TABLE) as "values" | Aliasing only happens to column C1 since the FROM block is a subquery. C1 -> "values".C1 (where "values" can be implicitly added by compiler). |
| SELECT COUNT(T.C1) FROM T JOIN P ON T.C1 = P.C1 | No aliasing, as FROM block only contains table |
| SELECT COUNT(T.C1) FROM (SELECT C1 FROM T) AS INPUT1 JOIN (SELECT C1 FROM T) AS INPUT2 ON INPUT1.C1 = INPUT2.C1 | Aliasing happens as both branches in join are subquery. C1 -> INPUT1.C1(First branch of JOIN) C1 -> INPUT1.C1(Second branch of JOIN) |

As yet another example, consider the following query: SELECT COUNT(C1) FROM (SELECT C1 FROM (SELECT C1 FROM <inner_query>) AS INPUT1) AS INPUT2. With respect to C1, each column C1 referred to in query has two aliases: an input alias, which comes from the FROM block of that query (SELECT C1 FROM <inner_query>), where the input alias here will be INPUT1.C1; and an output alias, which comes from the block-level alias (INPUT2 in this case), where the output alias will be INPUT2.C1 here. By using input/output aliases, every column can have a unique name by the query block it belongs to, and such aliases can be propagating and be "visible" to the privacy engine. In particular, for column c1, the generated relation can comprise FROM[[INPUT1.C1->INPUT2.C1], INNER_RELATION(SELECT C1 FROM <inner_query>)].

Figure 6:
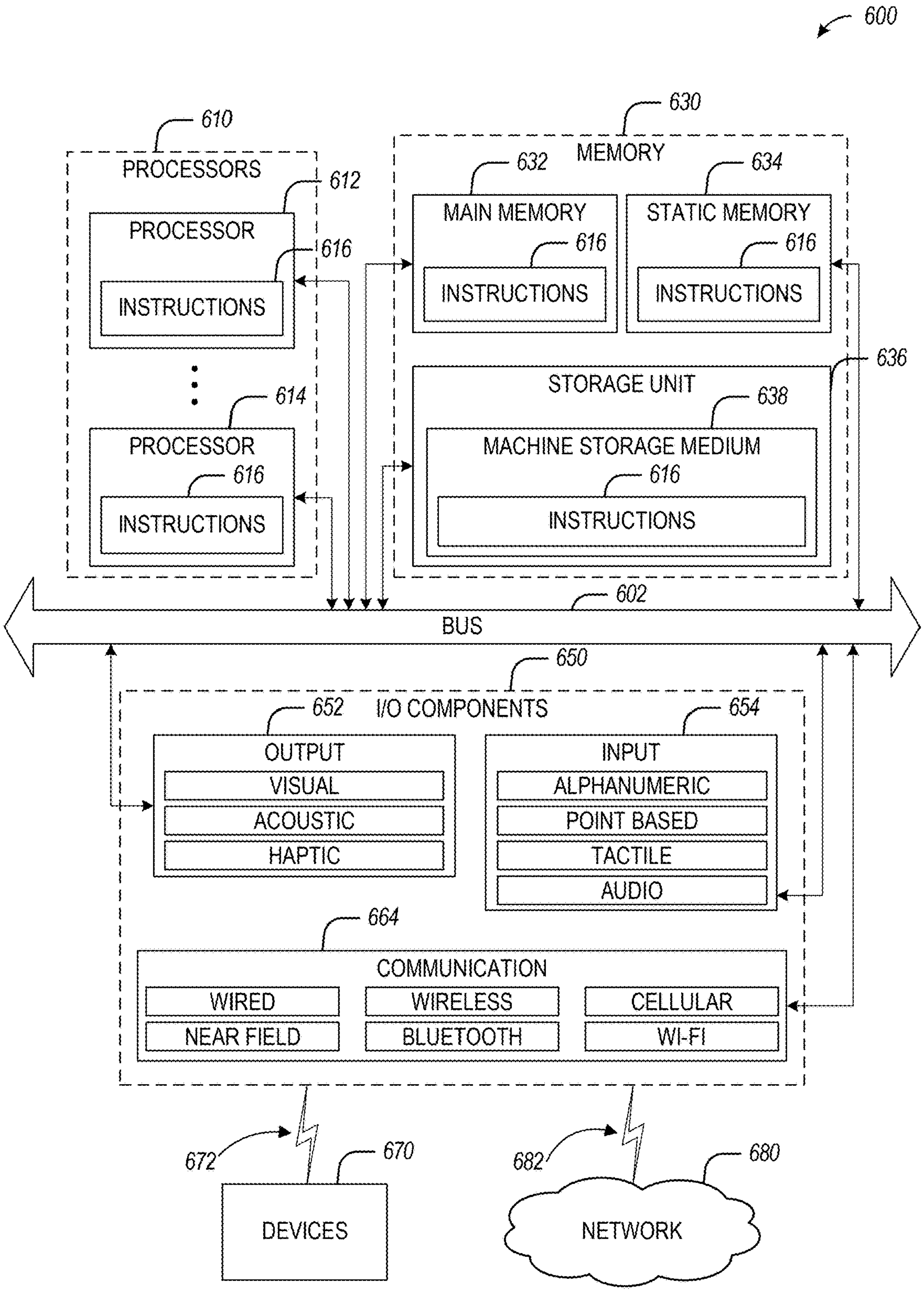
FIG. 6 illustrates a diagrammatic representation of a machine in the form of a computer system within which a set of instructions may be executed for causing the machine to perform any one or more of the methodologies discussed herein, according to some example embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of any one or more of the methods described herein. As another example, the instructions 616 may cause the machine 600 to implement portions of the data flows described herein. In this way, the instructions 616 transform a general, non-programmed machine into a particular machine 600 that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636 (e.g., on machine storage medium 638), within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of client devices 114, the compute service manager 108, the execution platform 110, and the devices 670 may include any other of these systems and devices.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: receiving a user query for execution; determining whether the user query is a differentially private query; and in response to determining that the user query is a differentially private query: determining input payload data for a privacy engine stored procedure based on a parse tree of the user query; generating rewritten parse tree by rewriting the parse tree of the user query to call the privacy engine stored procedure with the input payload data; processing the rewritten parse tree to execute the user query to generate a differential privacy-protected query result; and returning the differential privacy-protected query result in response to the user query.

In Example 2, the subject matter of Example 1 includes, wherein the determining of whether the user query is a differentially private query comprises: traversing a named resolved parse tree to determine whether a table or view referenced in the user query is protected by a privacy policy.

In Example 3, the subject matter of Examples 1-2 includes, wherein the determining of the input payload data comprises: mapping one or more nodes in the parse tree to one or more fields of the input payload data.

In Example 4, the subject matter of Examples 1-3 includes, wherein the operations comprise: validating one or more query patterns in the user query to ensure that the one or more query patterns are supported by the privacy engine.

In Example 5, the subject matter of Examples 1-4 includes, wherein the rewriting of the parse tree comprises: serializing the input payload data to generate serialized input payload data; and rewriting the parse tree to call the privacy engine stored procedure with the serialized input payload data.

In Example 6, the subject matter of Examples 1-5 includes, wherein the processing of the rewritten parse tree comprises: executing the privacy engine stored procedure with the input payload data.

In Example 7, the subject matter of Examples 1-6 includes, wherein the user query comprises multiple nested aggregate functions, and wherein the processing of the rewritten parse tree to execute the user query to generate the differential privacy-protected query result comprises: processing an outermost aggregate function of the multiple nested aggregate functions as a private-aggregate function and all other aggregate functions of the multiple nested aggregate as non-private-aggregates, the processing of the outermost aggregate function comprises injecting noise.

In Example 8, the subject matter of Examples 1-7 includes, wherein the user query comprises a join function, and wherein the processing of the rewritten parse tree to execute the user query to generate to the differential privacy-protected query result comprises: processing the join function such that a column of a privacy protected table is prevented from being joined with a column that has duplicate values.

In Example 9, the subject matter of Examples 1-8 includes, wherein the user query comprises a randomization interval function, and wherein the differential privacy-protected query result comprises randomization interval information that contextualizes an estimated magnitude of noise in the differential privacy-protected query result.

In Example 10, the subject matter of Example 9 includes, wherein the user query comprises a differentially private aggregate function, and wherein the randomization interval information comprises at least one of: a lower bound of a randomization interval for the differentially private aggregate function; or an upper bound of the randomization interval for the differentially private aggregate.

In Example 11, the subject matter of Examples 1-10 includes, wherein the operations comprise: validating one or more structured query language (SQL) constructs used in the user query to ensure they are supported by the privacy engine.

In Example 12, the subject matter of Example 11 includes, wherein the validating of the SQL constructs comprises: traversing a SQL abstract syntax tree and checking that nodes encountered in the SQL abstract syntax tree have valid corresponding nodes in a privacy engine abstract syntax tree.

Example 13 is a method to implement any of Examples 1-12.

Example 14 is a machine-storage medium, the machine-storage medium including instructions that when executed by a machine, cause the machine to perform operations to implement any of Examples 1-12.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various example embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving a user query for execution;

determining whether the user query is a differentially private query; and in response to determining that the user query is a differentially private query:

determining input payload data for a privacy engine stored procedure that encapsulates a privacy engine, the input payload data being determined based on a parse tree of the user query;

generating a rewritten parse tree by rewriting the parse tree of the user query to call the privacy engine stored procedure with the input payload data;

processing the rewritten parse tree to execute the user query to generate a differential privacy-protected query result, the processing of the rewritten parse tree comprises executing the privacy engine stored procedure, the executing of the privacy engine stored procedure comprising the privacy engine:

generating and submitting one or more non-differentially-private queries to a data system based on the input payload data;

receiving one or more non-differentially-private query results from the data system; and generating the differential privacy-protected query result based on the one or more non-differentially-private query results by generating noise and applying the noise to the one or more non-differentially-private query results; and returning the differential privacy-protected query result in response to the user query.

2. The system of claim 1, wherein the determining of whether the user query is a differentially private query comprises:

traversing a named resolved parse tree to determine whether a table or view referenced in the user query is protected by a privacy policy.

3. The system of claim 1, wherein the determining of the input payload data comprises:

mapping one or more nodes in the parse tree to one or more fields of the input payload data.

4. The system of claim 1, wherein the operations comprise:

validating one or more query patterns in the user query to ensure that the one or more query patterns are supported by the privacy engine.

5. The system of claim 1, wherein the rewriting of the parse tree comprises:

serializing the input payload data to generate serialized input payload data; and rewriting the parse tree to call the privacy engine stored procedure with the serialized input payload data.

6. The system of claim 1, wherein the user query comprises multiple nested aggregate functions, and wherein the processing of the rewritten parse tree to execute the user query to generate the differential privacy-protected query result comprises:

processing an outermost aggregate function of the multiple nested aggregate functions as a private-aggregate function and all other aggregate functions of the multiple nested aggregate as non-private-aggregates, the processing of the outermost aggregate function comprises injecting noise.

7. The system of claim 1, wherein the user query comprises a join function, and wherein the processing of the rewritten parse tree to execute the user query to generate to the differential privacy-protected query result comprises:

processing the join function such that a column of a privacy protected table is prevented from being joined with a column that has duplicate values.

8. The system of claim 1, wherein the user query comprises a randomization interval function, and wherein the differential privacy-protected query result comprises randomization interval information that contextualizes an estimated magnitude of noise in the differential privacy-protected query result.

9. The system of claim 8, wherein the user query comprises a differentially private aggregate function, and wherein the randomization interval information comprises at least one of:

a lower bound of a randomization interval for the differentially private aggregate function; or an upper bound of the randomization interval for the differentially private aggregate.

10. The system of claim 1, wherein the operations comprise:

validating one or more structured query language (SQL) constructs used in the user query to ensure they are supported by the privacy engine.

11. The system of claim 10, wherein the validating of the SQL constructs comprises:

traversing a SQL abstract syntax tree and checking that nodes encountered in the SQL abstract syntax tree have valid corresponding nodes in a privacy engine abstract syntax tree.

12. A method comprising:

receiving, by at least one processor, a user query for execution;

determining, by the at least one processor, whether the user query is a differentially private query; and in response to determining that the user query is a differentially private query:

determining, by the at least one processor, input payload data for a privacy engine stored procedure that encapsulates a privacy engine, the input payload data being determined based on a parse tree of the user query;

generating, by the at least one processor, a rewritten parse tree by rewriting the parse tree of the user query to call the privacy engine stored procedure with the input payload data;

processing, by the at least one processor, the rewritten parse tree to execute the user query to generate a differential privacy-protected query result, the processing of the rewritten parse tree comprises executing the privacy engine stored procedure, the executing of the privacy engine stored procedure comprising the privacy engine:

generating and submitting one or more non-differentially-private queries to a data system based on the input payload data;

receiving one or more non-differentially-private query results from the data system; and generating the differential privacy-protected query result based on the one or more non-differentially-private query results by generating noise and applying the noise to the one or more non-differentially-private query results; and returning, by the at least one processor, the differential privacy-protected query result in response to the user query.

13. The method of claim 12, wherein the determining of the whether the user query is a differentially private query comprises:

traversing a named resolved parse tree to determine whether a table or view referenced in the user query is protected by a privacy policy.

14. The method of claim 12, wherein the determining of the input payload data comprises:

mapping one or more nodes in the parse tree to one or more fields of the input payload data.

15. The method of claim 12, comprising:

validating query patterns in the user query to ensure they are supported by the privacy engine.

16. The method of claim 12, wherein the rewriting of the parse tree comprises:

serializing the input payload data to generate serialized input payload data; and rewriting the parse tree to call the privacy engine stored procedure with the serialized input payload data.

17. A machine-storage medium, the machine-storage medium including instructions that when executed by a machine, cause the machine to perform operations comprising:

receiving a user query for execution;

determining whether the user query is a differentially private query; and in response to determining that the user query is a differentially private query:

determining input payload data for a privacy engine stored procedure that encapsulates a privacy engine, the input payload data being determined based on a parse tree of the user query;

generating a rewritten parse tree by rewriting the parse tree of the user query to call the privacy engine stored procedure with the input payload data;

processing the rewritten parse tree to execute the user query to generate a differential privacy-protected query result, the processing of the rewritten parse tree comprises executing the privacy engine stored procedure, the executing of the privacy engine stored procedure comprising the privacy engine:

generating and submitting one or more non-differentially-private queries to a data system based on the input payload data;

receiving one or more non-differentially-private query results from the data system; and generating the differential privacy-protected query result based on the one or more non-differentially-private query results by generating noise and applying the noise to the one or more non-differentially-private query results; and returning the differential privacy-protected query result in response to the user query.

18. The machine-storage medium of claim 17, wherein the determining of the whether the user query is a differentially private query comprises:

traversing a named resolved parse tree to determine whether a table or view referenced in the user query is protected by a privacy policy.

19. The machine-storage medium of claim 17, wherein the determining of the input payload data comprises:

mapping one or more nodes in the parse tree to one or more fields of the input payload data.

20. The machine-storage medium of claim 17, wherein the operations comprise:

validating query patterns in the user query to ensure they are supported by the privacy engine.

* * * * *